US009364911B2

(12) United States Patent
Yoshizaki et al.

(10) Patent No.: US 9,364,911 B2
(45) Date of Patent: Jun. 14, 2016

(54) WORKING FLUID SUPPLY DEVICE OF ELECTRIC DISCHARGE MACHINE

(71) Applicant: FANUC CORPORATION, Minamitsuru-gun, Yamanashi (JP)

(72) Inventors: Daisuke Yoshizaki, Yamanashi (JP); Yoshinori Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 159 days.

(21) Appl. No.: 14/032,944

(22) Filed: Sep. 20, 2013

(65) Prior Publication Data

US 2014/0083536 A1   Mar. 27, 2014

(30) Foreign Application Priority Data

Sep. 21, 2012   (JP) .................................. 2012-208124

(51) Int. Cl.
*B23H 7/00*   (2006.01)
*B23H 1/10*   (2006.01)

(52) U.S. Cl.
CPC ........... *B23H 1/10* (2013.01); *Y10T 137/86035* (2015.04)

(58) Field of Classification Search
USPC ............... 219/68, 69.11, 69.12, 69.13, 69.14; 137/565.11, 565.15
See application file for complete search history.

(56) References Cited

U.S. PATENT DOCUMENTS

| 4,581,513 | A | * | 4/1986 | Obara et al. ................ 219/69.12 |
| 4,857,688 | A | | 8/1989 | Aso et al. |
| 5,605,638 | A | * | 2/1997 | Fujita ......................... 219/69.14 |
| 6,344,624 | B1 | * | 2/2002 | Moro et al. ................. 219/69.12 |
| 6,533,927 | B1 | * | 3/2003 | Hosaka ........................... 210/97 |
| 6,833,523 | B2 | * | 12/2004 | Kimura et al. ............. 219/69.12 |
| 7,465,899 | B2 | * | 12/2008 | Kita et al. .................. 219/69.12 |
| 2007/0175814 | A1 | | 8/2007 | Kita et al. |
| 2012/0228201 | A1 | | 9/2012 | Kasai et al. |

FOREIGN PATENT DOCUMENTS

| CN | 1559733 A | 1/2005 |
| CN | 101011764 A | 8/2007 |
| CN | 102672294 A | 9/2012 |
| JP | 61270030 A | 11/1986 |

(Continued)

OTHER PUBLICATIONS

Office Action mailed Mar. 4, 2014, corresponds to Japanese patent application No. 2012-208124.

(Continued)

*Primary Examiner* — Dana Ross
*Assistant Examiner* — Ayub Maye
(74) *Attorney, Agent, or Firm* — Hauptman Ham, LLP

(57) ABSTRACT

A working fluid supply device of an electric discharge machine draws up a cleaned fluid from a cleaned-fluid tank by means of a pump and supplies it to a working tank. The pump is connected with a first fluid circuit configured to supply the drawn cleaned fluid to the working tank and a second fluid circuit configured to supply the drawn cleaned fluid to an ion-exchange resin and a refrigerator. In supplying the cleaned fluid to the working tank, the first and second fluid circuits are opened and closed, respectively. In supplying the cleaned fluid to the ion-exchange resin and the refrigerator, the first and second fluid circuits are closed and opened, respectively.

8 Claims, 4 Drawing Sheets

(56) References Cited

FOREIGN PATENT DOCUMENTS

| | | |
|---|---|---|
| JP | 6368319 A | 3/1988 |
| JP | 9-253944 A | 9/1997 |

OTHER PUBLICATIONS

Office Action issued Apr. 27, 2015, corresponding to Chinese patent application No. 201310430393.5.

* cited by examiner

WORKING FLUID SUPPLY DEVICE OF ELECTRIC DISCHARGE MACHINE

RELATED APPLICATIONS

The present application is, and claims priority from, Japanese Application Number 2012-208124, filed Sep. 21, 2012, the disclosure of which is hereby incorporated by reference herein in its entirety.

BACKGROUND OF THE INVENTION

1. Field of the Invention

The present invention relates to a working fluid supply device of an electric discharge machine.

2. Description of the Related Art

A working fluid supply device is used in a wire electric discharge machine, which is a machine tool configured to perform machining of a workpiece based on electric discharge that occurs between a wire and the workpiece in a working fluid. The working fluid supply device serves to clean the working fluid, adjust the electrical resistance and temperature of the fluid, and supply the fluid to a working tank of the discharge machine. Working fluid supply devices of electric discharge machines can be roughly classified into two types, a cleaned-fluid storage type shown in FIG. 2 and a contaminated-fluid storage type shown in FIG. 3.

First, a working fluid supply device of the cleaned-fluid storage type will be described with reference to FIG. 2. In the description to follow, only those elements which are associated with the working fluid supply device of an electric discharge machine are illustrated, and illustration of a workpiece, wire electrode, structure for stretching the wire electrode, etc., is omitted.

Normally, electric discharge machining is performed with a workpiece immersed in a working fluid in a working tank 5. The working fluid is supplied to and stored in the working tank 5 by drawing up a cleaned fluid 10 from a cleaned-fluid tank 7 by means of a reservoir pump 1.

If electric discharge machining is performed in the working tank 5, the working fluid in the working tank is contaminated with chips produced by the machining. If the chips are trapped between the wire and the workpiece, the electric discharge machining becomes unstable. To achieve stable electric discharge machining, the cleaned fluid 10 is continuously injected from upper and lower nozzles 14 and 15 by a working fluid pump 4, whereby the space between the wire and the workpiece continues to be filled with the cleaned fluid suitable for the machining. The working fluid contaminated with the chips is returned as a contaminated fluid 9 from the working tank 5 to a contaminated fluid tank 6 through a pipe (not shown). As the contaminated fluid 9 is force-fed to a filter 8 by a filter pump 2, it is delivered as a cleaned fluid cleared of chips into the cleaned-fluid tank 7.

Since the accuracy of electric discharge machining varies depending on the temperature and electrical resistance of the working fluid, stable machining cannot be achieved by means of the simply cleaned fluid cleared of chips. Accordingly, the cleaned fluid 10 in the cleaned-fluid tank 7 is drawn up by a circulation pump 3, delivered to an ion-exchange resin 12 for adjusting the electrical resistance of the working fluid and a refrigerator 13 for temperature adjustment, and returned to the cleaned-fluid tank 7. In this way, the cleaned fluid 10 is adjusted to be suitable for electric discharge machining. The circulation pump 3 also has the function of delivering the cleaned fluid 10 directly from the cleaned-fluid tank 7 into the working tank 5 so that the working tank 5 continues to be supplied with the working fluid, in order to prevent various parts of a sealing mechanism of the tank 5 from being contaminated by adhesion of chips.

A working fluid supply device of the contaminated-fluid storage type will be described with reference to FIG. 3.

In the working fluid supply device of the cleaned-fluid storage type shown in FIG. 2, the reservoir pump 1 draws up the cleaned fluid 10 in the cleaned-fluid tank 7 and supplies it to the working tank 5. In the working fluid supply device of the contaminated-fluid storage type shown in FIG. 3, in contrast, the reservoir pump 1 draws up the contaminated fluid 9 in the contaminated fluid tank 6 and supplies it to the working tank 5.

A number of pumps are used in a working fluid supply device of a conventional wire electric discharge machine, whether of the cleaned-fluid storage type or of the contaminated-fluid storage type, as shown in FIG. 2 or 3. If the pumps are increased in number, however, they entail an increase in the size of the installation space and the number of associated parts, such as controllers, wires, etc. The increase in the number of parts in the working fluid supply device results in an increased failure rate and entails higher costs and larger space.

On the other hand, Japanese Patent Application Laid-Open No. 9-253944 discloses a working fluid supply device configured to switch, by means of an external operation, between a mode (first fluid circuit) in which a contaminated fluid 9 in a contaminated fluid tank 6 is drawn up by a single pump 16 and force-fed to a filter 8 through a first valve or a mode (second fluid circuit) in which the contaminated fluid 9 is supplied to a working tank 5 through a second valve, as shown in FIG. 4.

While the number of pumps used can be reduced with use of the working fluid supply device shown in FIG. 4, the contaminated fluid 9 drawn up from the contaminated fluid tank 6 by the pump 16 is contaminated water that is not yet filtered by the filter 8. If the fluid circuit through which the unfiltered contaminated fluid 9 passes is changed by the valves, then chips will adhere to the valves, possibly causing failure. If the contaminated fluid 9 in the contaminated fluid tank 6 is supplied directly to the working tank 5, moreover, then a workpiece will be immersed in a working fluid whose electrical resistance and temperature are not correctly adjusted due to inclusion of chips. As compared with the case of the working fluid supply device of the cleaned-fluid storage type, this is not desirable for electric discharge machining that varies in stability depending on the conditions of the working fluid.

As described above, the working fluid supply device of an electric discharge machine uses a plurality of pumps configured to supply the working fluid to a plurality of liquid circuits. However, the increase in the number of pumps used entails increased installation space, controllers, wires, etc. Thus, the greater the number of pumps used in the working fluid supply device, the higher or larger the required costs and space will be.

SUMMARY OF THE INVENTION

Accordingly, in view of the above problems of the prior art, the object of the present invention is to provide a working fluid supply device of an electric discharge machine, in which a plurality of fluid circuits are connected to a single pump for cleaned-fluid pumping so that the number of pumps used can be reduced without reducing the performance of the device, thereby achieving low-cost and space-saving properties.

In a working fluid supply device of an electric discharge machine according to the present invention, the electric discharge machine is configured to machine a workpiece attached to a working tank of the working fluid supply device in such a manner that the workpiece is immersed in a working fluid in the working tank. The working fluid supply device comprises a cleaned-fluid tank, an ion-exchange resin, a refrigerator, a pump configured to draw up a cleaned fluid from the cleaned-fluid tank, a first fluid circuit configured to supply the cleaned fluid drawn up by the pump to the working tank, a second fluid circuit configured to supply the cleaned fluid drawn up by the pump to the ion-exchange resin and the refrigerator, a first valve provided in the first fluid circuit, a second valve provided in the second fluid circuit, and a controller configured to performs open/close control of each of the first and second valves so that the cleaned fluid drawn up by the pump is supplied to the first or second fluid circuit.

The controller may be configured to stop the refrigerator when a command for supplying the working fluid from the first fluid circuit to the working tank is issued, and to actuate the refrigerator when the supply of the working fluid to the working tank is finished and the working fluid is supplied to the second fluid circuit.

According to the present invention, there may be provided a working fluid supply device of an electric discharge machine, in which a plurality of fluid circuits are connected to a single pump for cleaned-fluid pumping so that the number of pumps used can be reduced without reducing the performance of the device, thereby achieving low-cost and space-saving properties.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
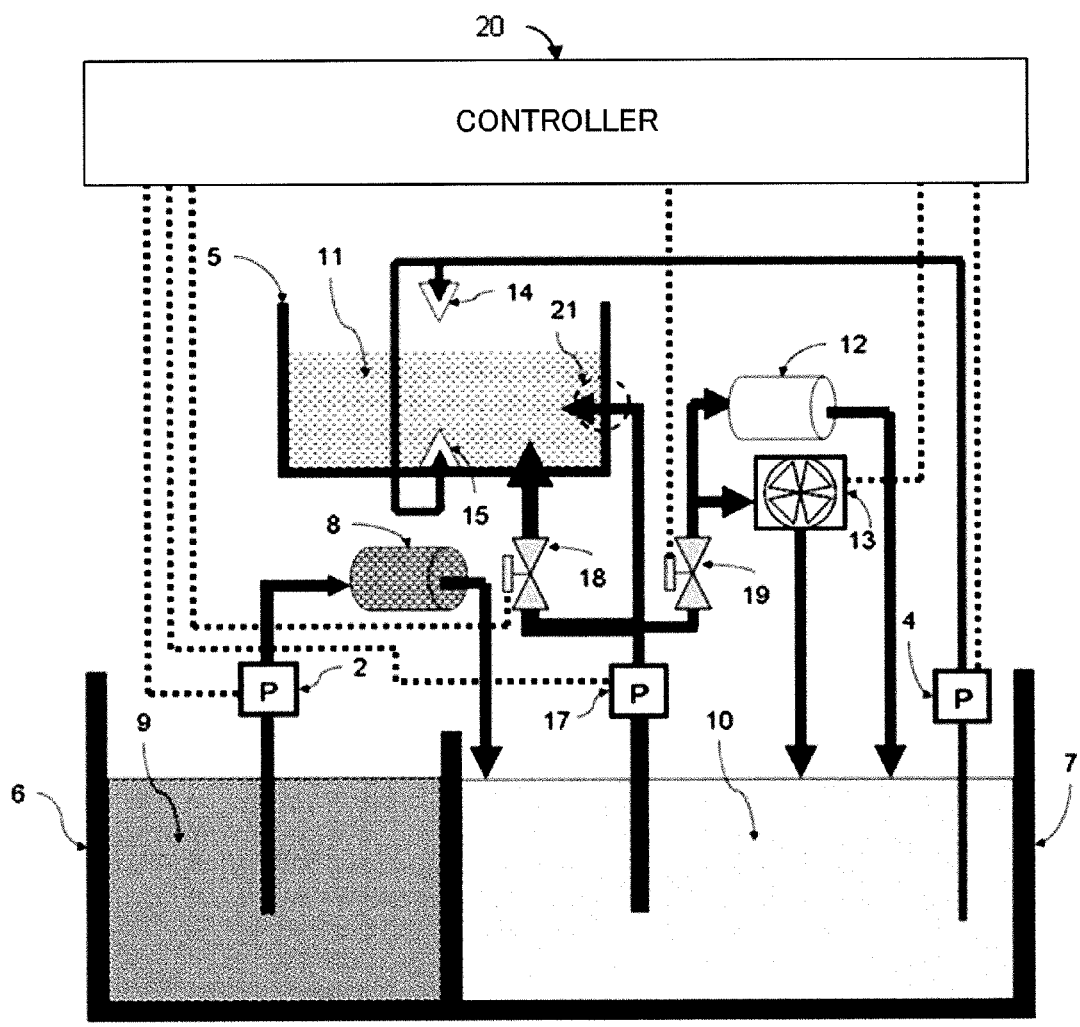
FIG. 1 is a diagram illustrating one embodiment of a working fluid supply device of an electric discharge machine according to the present invention.
Figure 2:
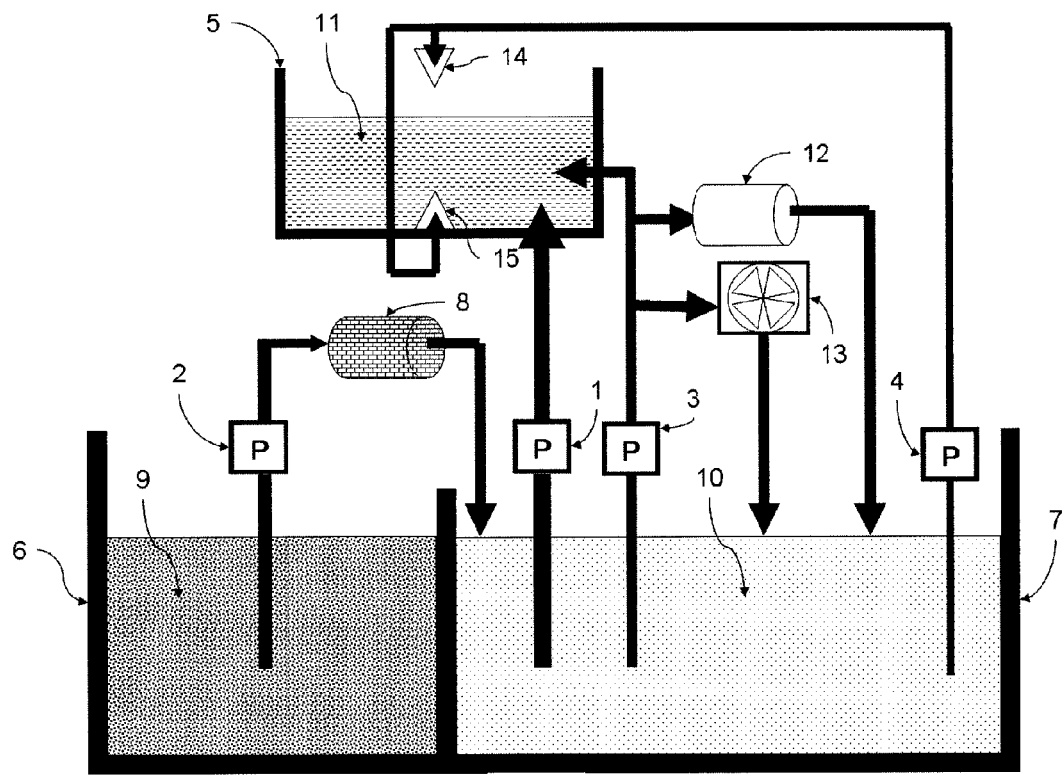
FIG. 2 is a diagram illustrating a working fluid supply device of a cleaned-fluid pumping type.
Figure 3:
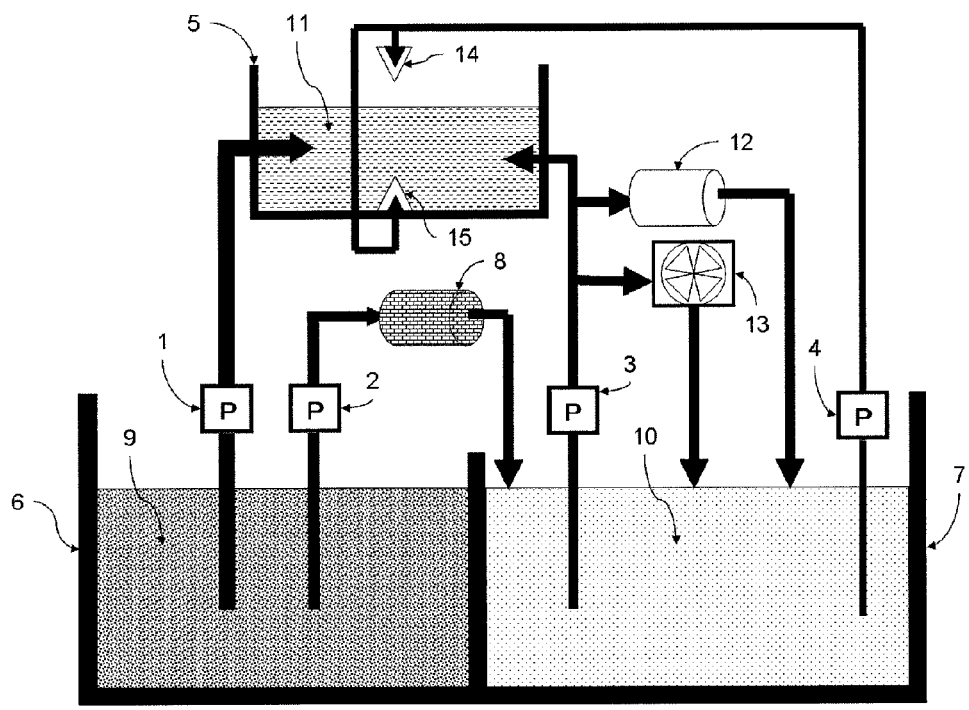
FIG. 3 is a diagram illustrating a working fluid supply device of a contaminated-fluid pumping type.
Figure 4:
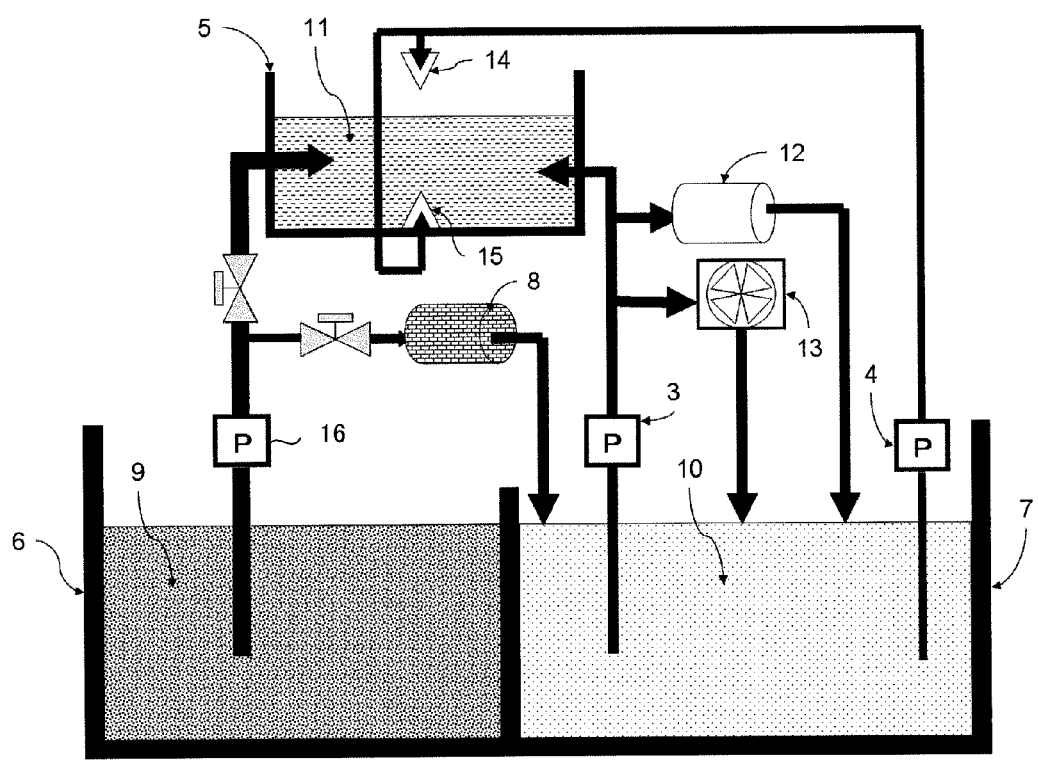
FIG. 4 is a diagram illustrating a working fluid supply device in which a fluid circuit for fluid supply to a working tank and a fluid circuit for fluid supply to a filter are connected to a single pump.

One embodiment of a working fluid supply device of an electric discharge machine according to the present invention will be described with reference to FIG. 1.

The working fluid supply device used in the wire electric discharge machine comprises a reservoir/circulation pump 17, first and second fluid circuits, first and second valves 18 and 19, and a controller 20. The reservoir/circulation pump 17 draws up a cleaned fluid 10 from a cleaned-fluid tank 7. The first fluid circuit supplies the cleaned fluid 10 drawn up by the pump 17 to a working tank 5 through the first valve 18. The second fluid circuit supplies the cleaned fluid 10 drawn up by the pump 17 to an ion-exchange resin 12 and a refrigerator 13 through the second valve 19. The first and second valves 18 and 19 are provided in the first and second fluid circuits, respectively. The controller 20 performs open/close control of the first and second valves 18 and 19 to switch the supply of the cleaned fluid 10 drawn up by the pump 17 to either the first fluid circuit or the second fluid circuit.

The controller 20 performs open/close control of the first and second valves 18 and 19 and also drivingly controls the refrigerator 13, as well as a filter pump 2, a working fluid pump 4, and the reservoir/circulation pump 17.

In the working fluid supply device of FIG. 1, as described above, the first fluid circuit for supplying the working fluid (cleaned fluid 10) to the working tank 5 and the second fluid circuit for supplying the cleaned fluid 10 to the ion-exchange resin 12 and the refrigerator 13 are connected to a single pump (reservoir/circulation pump 17), and the controller 20 opens the first valve 18 in the first fluid circuit or the second valve 19 in the second fluid circuit. Thus, in storing the cleaned fluid 10 in the working tank 5, the first and second valves 18 and 19 are opened and closed, respectively, under the control of the controller 20, whereupon the first fluid circuit is formed. In supplying the cleaned fluid 10 to the ion-exchange resin 12 and the refrigerator 13, in contrast, the first and second valves 18 and 19 are closed and opened, respectively, whereupon the second fluid circuit is formed. Further, the cleaned fluid 10 continues to be supplied to a sealing mechanism section 21 without regard to the state, open or close, of the first and second valves 18 and 19.

As described above, the control by the controller 20 enables the reservoir/circulation pump 17 to be alternatively used as a reservoir pump for storing the cleaned fluid 10 in the working tank 5 or a circulation pump for supplying the cleaned fluid 10 in the cleaned-fluid tank 7 to the ion-exchange resin 12 and the refrigerator 13 and then returning it to the tank 7. Thus, the number of pumps used can be reduced.

As a workpiece in the working tank 5 is subjected to electric discharge machining, the contaminated working fluid in the working tank 5 is delivered to a contaminated fluid tank 6 through a pipe (not shown). Specifically, the contaminated working fluid in the working tank 5 is recovered as a contaminated fluid in the contaminated fluid tank 6. Then, the contaminated fluid in the contaminated fluid tank 6 is drawn up and delivered to a filter 8 by the filter pump 2, cleared of extraneous matter, such as chips, and delivered as a cleaned fluid into the cleaned-fluid tank 7.

As described above, the cleaned fluid 10 drawn up from the cleaned-fluid tank 7 by the reservoir/circulation pump 17 is a cleaned fluid filtered by the filter 8 and adjusted in both electrical resistance and temperature to be suitable for machining.

Since the reservoir/circulation pump 17 draws up the cleaned fluid 10 filtered by the filter 8 and passes it to the first fluid circuit (first valve 18) or the second fluid circuit (second valve 19, ion-exchange resin 12, and refrigerator 13), moreover, there is no possibility of chips adhering to the first and second valves 18 and 19, ion-exchange resin 12, and the refrigerator 13 and causing trouble.

The first and second fluid circuits may be enabled and disabled, respectively, by opening and closing the first and second valves 18 and 19, respectively, so that the cleaned fluid 10 drawn up from the cleaned-fluid tank 7 by the reservoir/circulation pump 17 is supplied to the working tank 5 through the first fluid circuit. In other words, the first and second valves 18 and 19 may be open/close-controlled so that the pump 17 is alternatively used to store the working fluid in the working tank 5. If this is done, the working fluid to be supplied to the refrigerator 13 may possibly be stopped so that the working fluid in the refrigerator 13 is super-cooled.

In order to solve this problem, the controller 20 is configured to issue a command (fluid-storage command) to close and open the first and second valves 18 and 19, respectively, and at the same time, transmit a pause signal to the refrigerator 13. If the refrigerator 13 is stopped and completion of fluid storage in the working tank 5 is detected by a fluid-level sensor (not shown) that detects the level of the working fluid in the working tank 5, the second valve 19 is opened, the working fluid is supplied to the second fluid circuit, and at the same time, the refrigerator 13 is restarted. In this way, the problem of super-cooling of the working fluid in the refrigerator 13 can be avoided.

According to the above-described embodiment of the working fluid supply device of the present invention, the device is designed to be low-cost and space-saving by reducing the number of pumps used without reducing its reliability and performance.

In the embodiment described above, the second valve 19 in the second fluid circuit is a valve that can assume two states, open and close. However, the second valve 19 is not limited to the valve of this type, and may alternatively be configured to be able to assume, for example, a half-open state, in addition to the open and close states. According to this arrangement, the second valve 19 can be kept half-open without being fully closed when the fluid-storage command is issued with the first valve 18 open, so that super-cooling of the working fluid in the refrigerator 13 can be avoided.

Further, the working fluid supply device described herein is not limited to the application to the wire electric discharge machine, and may also be used as a fluid supply device of an electric discharge machine configured for die sinking.

The invention claimed is:

1. A working fluid supply device of an electric discharge machine, wherein the electric discharge machine is configured to machine a workpiece immersed in a working fluid in a working tank the working fluid supply device configured to supply the working fluid to the working tank and comprising:
   a cleaned-fluid tank;
   an ion-exchange resin;
   a refrigerator;
   a pump configured to draw up a cleaned fluid from the cleaned-fluid tank;
   a first fluid circuit configured to supply the cleaned fluid drawn up by the pump to the working tank;
   a second fluid circuit configured to supply the cleaned fluid drawn up by the pump to the ion-exchange resin and the refrigerator;
   a first valve provided in the first fluid circuit;
   a second valve provided in the second fluid circuit; and
   a controller configured to open and close each of the first and second valves so that the cleaned fluid drawn up by the pump is alternatively supplied to the first fluid circuit and the second fluid circuit.

2. The working fluid supply device according to claim 1, wherein the controller is configured
   to stop the refrigerator when a command for supplying the cleaned fluid from the first fluid circuit to the working tank is issued, and
   to actuate the refrigerator when the supply of the cleaned fluid to the working tank is finished and the cleaned fluid is supplied to the second fluid circuit.

3. The working fluid supply device according to claim 1, wherein, when the second valve is opened, the controller is configured to cause the cleaned fluid drawn up by the pump to flow in the second fluid circuit through the ion-exchange resin and the refrigerator and then return to the cleaned-fluid tank.

4. The working fluid supply device according to claim 1, wherein the controller is configured to
   set the second valve in a half-opened state when the first valve is opened, and
   set the second valve in an opened state when the first valve is closed.

5. The working fluid supply device according to claim 1, further comprising:
   a third fluid circuit configured to supply the cleaned fluid drawn up by the pump to the working tank regardless of the first and second valves.

6. The working fluid supply device according to claim 3, further comprising:
   a third fluid circuit configured to supply the cleaned fluid drawn up by the pump to the working tank regardless of the first and second valves.

7. The working fluid supply device according to claim 4, wherein, when the second valve is in the opened state or the half-opened state, the controller is configured to cause the cleaned fluid drawn up by the pump to flow in the second fluid circuit through the ion-exchange resin and the refrigerator and then return to the cleaned-fluid tank.

8. The working fluid supply device according to claim 7, further comprising:
   a third fluid circuit configured to supply the cleaned fluid drawn up by the pump to the working tank regardless of the first and second valves.

* * * * *